April 24, 1934.                M. ALEX                    1,955,724
          METHOD AND APPARATUS FOR COOLING BEVERAGES AND THE LIKE
                           Filed Dec. 3, 1932
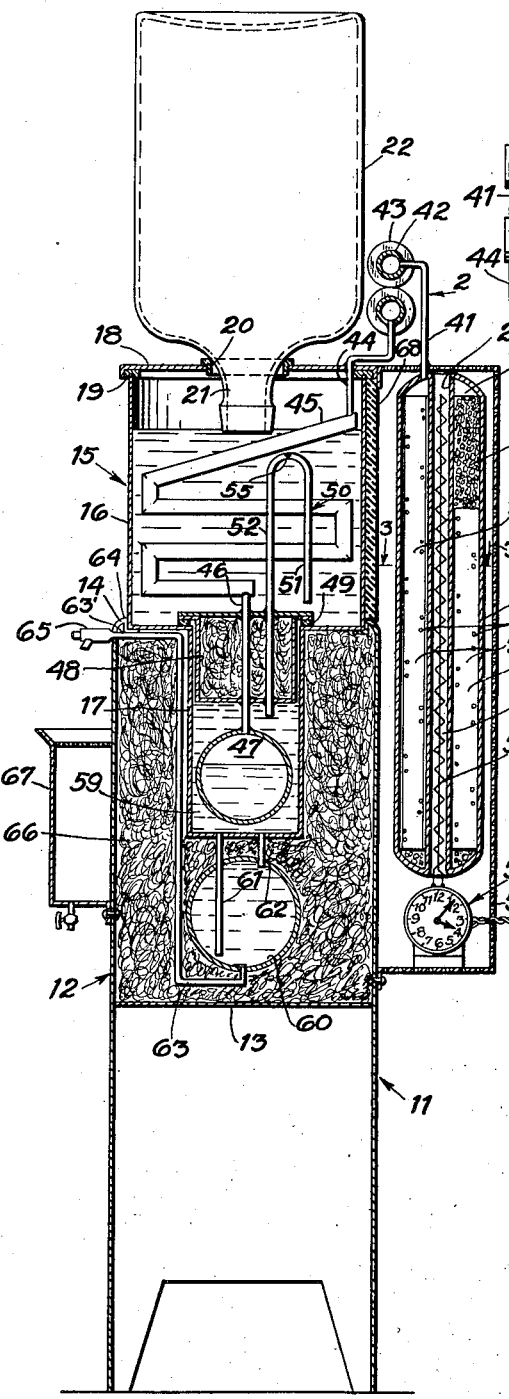
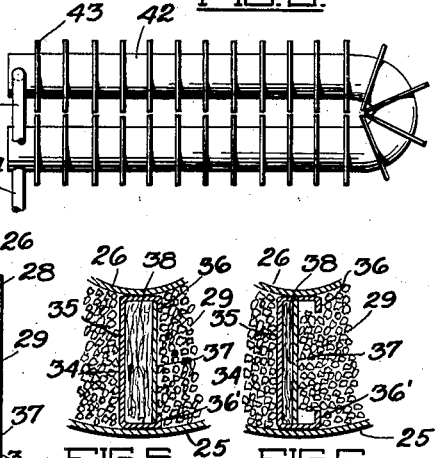
INVENTOR
MAX ALEX
BY
ATTORNEY Patented Apr. 24, 1934

1,955,724

UNITED STATES PATENT OFFICE 1,955,724

METHOD AND APPARATUS FOR COOLING BEVERAGES AND THE LIKE

Max Alex, Alhambra, Calif.

Application December 3, 1932, Serial No. 645,528

17 Claims. (Cl. 62—118)

This invention relates in a general way to the art of refrigeration. It is more particularly related to a novel refrigerating method and apparatus which is particularly adapted for use in cooling beverages such as drinking water and the like.

The present invention is a continuation in part of my application for patent on Beverage refrigerating systems, Serial No. 620,357, filed July 1, 1932, and, like the invention of my former application, has as one object the production of a refrigerating method or a refrigerating system wherein a gaseous refrigerant is periodically expelled from a suitable absorbent by the application of heat and is condensed, after which the absorbent is cooled and the condensed refrigerant is allowed to evaporate over a substantial period of time and is reabsorbed by the absorbent, the beverage itself acting as the heat withdrawal medium during the first step and also controlling to an extent the evaporation of the condensed refrigerant, in proportion to the withdrawal of the beverage, during the second step.

It is a further object of this invention to produce a refrigerating apparatus for carrying out the method described above which has no moving parts; is automatic and noiseless in operation; is compact and cheap to manufacture; and is effective to maintain a quantity of cold liquid available for withdrawal in limited amounts over a substantial period of time.

The general construction of the refrigerating unit contemplated by this invention comprises an absorber generator which is adapted to be filled with a suitable absorbent containing a fluid refrigerant; means for periodically heating the absorber generator; a heat exchanger and condensing conduit; and a condensate reservoir connected with the last mentioned conduit.

The heat exchanger and condensing conduit is adapted to be immersed in or otherwise arranged with its wall in contact with a body of the liquid to be cooled, such body of liquid being contained in, what I may term, a liquid receiving reservoir. The condensate reservoir is adapted to be immersed in another body of the same liquid, the two bodies of liquid preferably being separated by an insulating member.

As pointed out above, the unit contemplated by this invention lends itself particularly to use in cooling beverages such as drinking water and the like, and it is a further object of this invention to produce an apparatus of the class described wherein all of the parts of the refrigerating means are sealed to form a single unit, such unit being constructed so that it can be readily installed in and removed from a housing which is so formed that an insulating member between the heat exchanger-condenser and the condensate reservoir divides the housing into the liquid receiving reservoir and the liquid cooling reservoir.

It will be understood that inasmuch as the liquid in the liquid receiving reservoir is utilized to withdraw the heat of vaporization from the gaseous refrigerant, the generating periods may be attended by a certain rise in temperature in the liquid in this reservoir and the temperature of the liquid in the cooling reservoir may also be slightly increased. For this reason, it is preferable to so regulate the heat control as to bring these periods of generation into the night or into such time as the water or other beverage is not being withdrawn. This will give the liquid in the receiving reservoir an opportunity to dissipate its heat to the atmosphere and will also give the refrigerating system an opportunity to reduce the temperature of the liquid in the cooling reservoir to the desired point before such liquid is to be used. However, it may be in a unit from which considerable liquid is being dispensed that it is necessary to have more than one period of generation for every twenty-four hours, and in order that there may be a supply of cold liquid in the apparatus during such a period of generation, I provide, what I may term, a liquid storage reservoir which is connected to the liquid cooling reservoir.

Although various materials may be used as an absorbent in the absorber-generator, I consider it important from the standpoint of safety and efficiency in operation to employ a dry absorbent such as granulated or pulverized calcium chloride. Various fluid refrigerants may also be used, but for the purpose of describing the invention I will refer to the use of dry ammonia gas ($NH_3$). When ammonia gas is absorbed by calcium chloride the absorbent expands and solidifies to a substantially solid mass. To obtain the desired efficiency in the apparatus, therefore, I consider it a still further object of this invention to provide the absorber-generator with means which will permit the expansion of the absorbent and which will, at the same time, provide ducts or passages whereby the gaseous refrigerant may be delivered to all points throughout the body of the absorbent, and it is a further feature of such means that they are arranged so as to conduct the heat from the heating element throughout the absorber during the generating step.

I consider it a still further object of this invention to provide means for subjecting the gaseous refrigerant, immediately after it has been expelled from the absorbent and before it enters the first body of liquid to be cooled, to a primary cooling action, and a preferred form of apparatus contemplated by this invention embodies an air cooled pipe or coil through which the refrigerant passes prior to entering the conduit which is exposed in the liquid receiving reservoir.

The details in the construction of a preferred form of my invention, together with other objects attending its production, will be best understood from the following description of the accompanying drawing which is chosen for illustrative purposes only, and in which—

Fig. 1 is an elevational view partly in section showing a preferred form of my invention;

Fig. 2 is a fragmentary side view taken in the direction of the arrow 2 of Fig. 1;

Fig. 3 is a plan section taken in a plane represented by the line 3—3 in Fig. 1;

Fig. 4 is a fragmentary view with parts broken away illustrating a preferred form of spacing member used in the absorber-generator; and Figs. 5 and 6 are fragmentary sections illustrating the operation of the spacing members under the expansive action of the absorbent.

More particularly describing the invention as herein illustrated, reference numeral 11 indicates, what I may term, a stand, the upper portion 12 of which is made in the nature of a shell or compartment having a bottom 13. The top of the compartment 12 is formed with an inwardly extending flanged edge 14 which supports, what I may term, a housing 15.

It will be observed that the housing is formed with a top portion 16, which I may term a liquid receiving reservoir, and a downwardly projecting portion 17 which is shown as being of smaller diameter than the top portion and which forms a liquid cooling reservoir. The liquid receiving reservoir in this form of my invention is provided with a cover member 18, a gasket 19 being interposed between the cover member and the upper edge of the liquid receiving reservoir. The cover member 18 is shown as being provided with a central aperture 20 which is adapted to receive the neck 21 of an inverted jug or bottle 22 containing water or other suitable beverage. In this connection, however, it is to be understood that the refrigerating system contemplated by this invention is not confined to use in connection with bottled water or bottled beverages but that it might, by suitable float or other valve mechanism, be directly connected to a water supply line.

The refrigerating unit contemplated by this invention comprises an absorber-generator 25 which is shown as comprising an elongated shell provided with an axial tube 26 which forms, what I may term, a central heating chamber 27 and an annular outer chamber 28, the latter chamber containing a suitable absorbent 29.

An electric heating element 30 is shown as being mounted in the central heating chamber, such heating element being periodically connected in an electric circuit through the medium of a clock or time-operated switch, generally indicated by reference numeral 31. In this connection it is to be understood that, while I prefer to use an electrical heating element, other sources of heat may be employed, and that, while I have shown as the periodic control for such heating element, a clock or time switch, other means, such as a thermostat may be used. The absorber-generator is shown as being enclosed in a perforated housing generally indicated by reference numeral 32.

As was mentioned earlier in the specification, the dry absorbent used in the system contemplated by this invention expands and forms a solid mass when the refrigerant is supplied thereto. In order to compensate for this expansion and further to provide means for delivering the gaseous refrigerant to all parts of the absorbent mass, also to permit the uniform expulsion of refrigerant from the solid mass during the heating operation, and further to efficiently conduct the heat throughout the mass of the absorbent, I provide a plurality of hollow perforated spacing members which are indicated by reference numeral 34 and which are interposed between the central tube 26 and the outer wall of the shell. The construction and arrangement of these spacing members are best illustrated in Figs. 3 to 6 inclusive, where they are shown as being radially mounted in the shell and as comprising channels 35, the edges of which are bent inwardly to form flanges 36, 36' which support a diaphragm plate 37. The space thus formed is preferably filled with a compressible material which has a comparatively high conductivity and which is not attacked to any appreciable extent by the refrigerant. One material which I have satisfactorily used for this purpose is steel wool, such material being indicated by reference numeral 38.

In Fig. 5 I show the spacing unit as it appears when it is first placed in the absorber-generator and the absorber-generator is filled with the absorbent 29. When the generator is charged with the refrigerant (ammonia) the absorbent 29 expands as indicated in Fig. 6, compressing the packing 38 but at the same time leaving a space in the spacing member through which the gaseous refrigerant may pass during both the expulsion or generating step and the absorption step.

The channel and the diaphragm are both perforated, as indicated at 40, to permit the free passage of gas into the absorbent.

The steel wool, in addition to the functions enumerated above, serves the additional purpose of preventing the absorbent from being forced into the space between the two face members of the spacing units.

The shell 25 which is sealed and is constructed so as to withstand the pressure of the absorbent during a generating period is provided with an inlet-outlet connection indicated by reference numeral 41. The connection 41 leads to a primary cooling coil or pipe 42 which is provided with fins 43 and which has an outlet connection 44 leading to a heat exchanger and condenser conduit 45. The conduit 45, which is shown as comprising a coiled or bent pipe formed for reception in the liquid receiving reservoir has an outlet conduit 46, the lower end of which is mounted in a condensate reservoir 47. The condensate reservoir 47 is situated in the liquid cooling reservoir 17 and a plug 48, shown as being in the form of a covered cup filled with insulating material, is mounted on the conduit 46 and cooperates with a gasket 49 to separate the liquid receiving reservoir from the liquid cooling reservoir.

Liquid is delivered from the liquid receiving reservoir into the liquid cooling reservoir through an inverted U-shaped siphon tube 50, one leg 51 of which has an inlet opening near the bottom of the liquid receiving reservoir and the other leg 52 of which extends downwardly through the insulating plug or cup 48 and opens into the liquid receiving reservoir.

It is important in the operation of a device of the type described above that a substantial quantity of liquid be maintained at all times in the liquid receiving reservoir. At the same time it is desirable that the liquid delivered into the liquid cooling reservoir come from the bottom portion of the liquid receiving reservoir. For this reason I employ the siphon tube, the bend of which extends into the upper portion of the liquid receiving reservoir and I control the level of the liquid in such reservoir by providing the top of such tube with a pin hole orifice indicated by reference numeral 55.

From this construction it will be seen that when the level of the liquid falls below the level of the orifice the siphon action in the tube is broken and no more liquid can be withdrawn from the liquid receiving reservoir into the liquid cooling reservoir.

The operation of the devices which I have described so far is substantially as follows:

The absorber generator 25, having been filled with the dry absorbent and charged with refrigerant in a quantity suitable to substantially saturate the absorbent, is sealed in any suitable manner in open communication with the inlet-outlet conduit 21, the preliminary cooler 42, the heat exchanger and condenser pipe 45, and the condensate reservoir 47.

The parts being assembled in the manner shown in Fig. 1, the liquid receiving reservoir 16 and the liquid cooling reservoir 17 having been filled with the liquid to be cooled, the absorbent in the absorber-generator is heated through the medium of the heating element 30 for a comparatively brief period, say two hours, in order to expel the fluid refrigerant. The gaseous refrigerant, thus expelled, passes through the primary cooling pipe 42 where a portion of the heat is dissipated to the atmosphere and the partially cooled refrigerant then passes into the heat exchanger-condenser pipe 45 where the heat of vaporization is absorbed by the liquid in the liquid receiving reservoir 16 with a consequent condensation of the refrigerant. The condensed refrigerant flows on down into the condensate receiving reservoir. After the current to the heating element has been shut off, the absorbent starts to cool, such cooling action being attended by a reabsorption of gaseous refrigerant which is attended by a drop in pressure on the liquid-vapor system in the associated conduits and in the condensate reservoir.

In the meantime, the heat absorbed by the liquid in the reservoir 16 has been largely dissipated to the atmosphere through the conducting walls of the reservoir, and the drop in pressure resulting from the absorption of gas in the absorber-generator causes a partial vaporization of the liquid in the condensate reservoir. This vaporization, of course, is accompanied by the absorption of heat from the liquid in the liquid cooling reservoir and the low temperature vapors rising through the heat absorber and condenser pipe will further reduce the temperature of the liquid in the reservoir 16. This action reaches equilibrium in a comparatively short time, depending upon the atmospheric temperature, and the rate of absorption of the absorbent in the absorber-generator.

Any liquid which is withdrawn from the liquid cooling reservoir is displaced by the liquid from the reservoir 16 which raises the temperature of the liquid in the liquid cooling reservoir and is followed by an increased rate of vaporization in the condensate reservoir in order to absorb that additional heat. It will be seen, therefore, that the rate of vaporization is, to a certain extent, controlled by the periodic removal of liquid from the liquid cooling reservoir.

It was pointed out above that the generating action was attended by a slight increase in temperature of the liquid to be cooled, and, for this reason, in a water cooler, such as I have described as an example to illustrate the invention, the time switch is set so that it operates during the night or in the early morning at a time when the atmosphere is at its lowest temperature, and when it is not desired to use the water from the cooler.

It may be, however, that where a large quantity of water is being used, more refrigerating action may be required than can be obtained in the manner just described, and, under these circumstances, it may be necessary to have more than one generating period every 24 hours.

In the event it is desired to have a generating period sometime within the period of use, and, furthermore, to always insure a supply of cold water, I provide, what I may term, a cold liquid storage reservoir, indicated by reference numeral 59.

This reservoir is preferably situated below the liquid cooling reservoir, and is shown as being connected therewith through a conduit 61, which extends substantially to the bottom of the storage reservoir 60, and another conduit 62 which opens into the top of the storage reservoir. By using these two conduits in this manner, I provide means for always maintaining the coldest liquid in the storage reservoir.

Reference numeral 63 indicates an outlet conduit, the upper end portion 63' of which extends outwardly through a notch 64 formed in the upper edge of the shell 12, and is provided with a suitable faucet 65.

Reference numeral 66 indicates insulating material, such as mineral wool or fibre asbestos, or any other suitable material, which encloses the liquid cooling reservoir and the liquid storage reservoir.

Reference numeral 65 indicates a drainage receptacle which is situated below the faucet 65, and reference numeral 68 indicates an insulating plate which is interposed between the absorber-generator and the reservoir 16.

It will be apparent from the foregoing description that the refrigerating system contemplated by this invention is of simple form and construction, and may be economically manufactured and, furthermore, the apparatus is extremely compact, it has no moving parts to get out of order, and it is noiseless and automatic in operation.

It is to be understood that, while I have herein described and illustrated one preferred form of apparatus for effecting the method contemplated by this invention, the invention is not limited to the precise construction described above but includes within its scope whatever changes fairly come within the spirit of the appended claims.

I claim as my invention:

1. A liquid cooler of the class described embodying: a housing forming a liquid receiving reservoir and a liquid cooling reservoir; an insulating plug mounted in the top of said liquid cooling reservoir and separating same from said liquid receiving reservoir; a refrigerant condensing pipe in said liquid receiving reservoir; a condensate reservoir in said liquid cooling reservoir; a conduit connecting said condensate reservoir with said refrigerant condensing pipe; means for periodically generating a gaseous refrigerant and delivering same into said refrigerant condensing pipe; and a conduit for delivering liquid from said liquid receiving reservoir through said plug into said liquid cooling reservoir.

2. A liquid cooler of the class described embodying: a housing forming a liquid receiving reservoir and a liquid cooling reservoir; an insulating plug mounted in the top of said liquid cooling reservoir and separating same from said liquid receiving reservoir; a refrigerant condensing pipe in said liquid receiving reservoir; a condensate reservoir in said liquid cooling reservoir; a conduit connecting said condensate reservoir with said refrigerant condensing pipe; means for periodically generating a gaseous refrigerant and delivering same into said refrigerant condensing pipe; and a conduit for delivering liquid from said liquid receiving reservoir through said plug into said liquid cooling reservoir, said condensing pipe, said plug, and said condensate receiving reservoir being removable from said housing as a unit.

3. A liquid cooler of the class described embodying: a housing forming a liquid receiving reservoir and a liquid cooling reservoir; an insulating plug mounted in the top of said liquid cooling reservoir and separating same from said liquid receiving reservoir; a refrigerant condensing pipe in said liquid receiving reservoir; a condensate reservoir in said liquid cooling reservoir; a conduit connecting said condensate reservoir with said refrigerant condensing pipe; means for periodically generating a gaseous refrigerant and delivering same into said refrigerant condensing pipe; and a siphon tube having one leg extending through said plug and opening into said liquid cooling reservoir and having another leg with an inlet opening in the bottom of said liquid receiving reservoir.

4. A liquid cooler of the class described embodying: a housing forming a liquid receiving reservoir and a liquid cooling reservoir; an insulating plug mounted in the top of said liquid cooling reservoir and separating same from said liquid receiving reservoir; a refrigerant condensing pipe in said liquid receiving reservoir; a condensate reservoir in said liquid cooling reservoir; a conduit connecting said condensate reservoir with said refrigerant condensing pipe; means for periodically generating a gaseous refrigerant and delivering same into said refrigerant condensing pipe; and a siphon tube having one leg extending through said plug and opening into said liquid cooling reservoir and having another leg with an inlet opening in the bottom of said liquid receiving reservoir, said siphon tube having a pin hole orifice in the top portion of said liquid receiving conduit.

5. A liquid cooler of the class described embodying: a housing forming a liquid receiving reservoir and a liquid cooling reservoir; insulating means surrounding said liquid cooling reservoir; an insulating plug mounted in the top of said liquid cooling reservoir and separating same from said liquid receiving reservoir; a refrigerant condensing pipe in said liquid receiving reservoir; a condensate reservoir in said liquid cooling reservoir; a conduit connecting said condensate reservoir with said refrigerant condensing pipe; means for periodically generating a gaseous refrigerant and delivering same into said refrigerant condensing pipe; and a conduit for delivering liquid from said liquid receiving reservoir through said plug into said liquid cooling reservoir.

6. A liquid cooler of the class described embodying: a housing forming a liquid receiving reservoir and a liquid cooling reservoir; an insulating plug mounted in the top of said liquid cooling reservoir and separating same from said liquid receiving reservoir; a refrigerant condensing pipe in said liquid receiving reservoir; a condensate reservoir in said liquid cooling reservoir; a conduit connecting said condensate reservoir with said refrigerant condensing pipe; means for periodically generating a gaseous refrigerant and delivering same into said refrigerant condensing pipe; a conduit for delivering liquid from said liquid receiving reservoir through said plug into said liquid cooling reservoir; and valved outlet conduit means connected with said liquid cooling reservoir.

7. A liquid cooler of the class described embodying: a housing forming a liquid receiving reservoir and a liquid cooling reservoir; an insulating plug mounted in the top of said liquid cooling reservoir and separating same from said liquid receiving reservoir; a refrigerant condensing pipe in said liquid receiving reservoir; a condensate reservoir in said liquid cooling reservoir; a conduit connecting said condensate reservoir with said refrigerant condensing pipe; means for periodically generating a gaseous refrigerant and delivering same into said refrigerant condensing pipe; a conduit for delivering liquid from said liquid receiving reservoir through said plug into said liquid cooling reservoir; and valved outlet conduit means connected with said liquid cooling reservoir, said last mentioned conduit means including a cooled liquid storage reservoir.

8. A liquid cooler of the class described embodying: a housing forming a liquid receiving reservoir and a liquid cooling reservoir; an insulating plug mounted in the top of said liquid cooling reservoir and separating same from said liquid receiving reservoir; a refrigerant condensing pipe in said liquid receiving reservoir; a condensate reservoir in said liquid cooling reservoir; a conduit connecting said condensate reservoir with a refrigerant condensing pipe; means for periodically generating a gaseous refrigerant and delivering same into said refrigerant condensing pipe; a conduit for delivering liquid from said liquid receiving reservoir through said plug into said liquid cooling reservoir; a valved outlet conduit including a cooled liquid storage reservoir connected with said liquid cooling reservoir; and insulating means surrounding said liquid cooling reservoir and said liquid storage reservoir.

9. For use in a liquid cooler of the class described, a refrigerating unit embodying: a generator-absorber filled with a dry absorbent containing a fluid refrigerant; means for periodically heating said generator absorber to expel said refrigerant; a heat exchanger and condenser pipe connected with said generator-absorber and adapted to be continuously immersed in a first reservoir of liquid to be cooled; an outlet conduit connected with said last mentioned pipe; and a condensate reservoir connected with said outlet conduit and adapted to be continuously immersed in a second reservoir of liquid to be cooled.

10. For use in a liquid cooler of the class described, a refrigerating unit embodying: a generator-absorber filled with a dry absorbent containing a fluid refrigerant; means for periodically heating said generator-absorber to expel said refrigerant; a heat exchanger and condenser pipe connected with said generator-absorber and adapted to be continuously immersed in a first reservoir of liquid to be cooled; an outlet conduit connected with said last mentioned pipe; a condensate reservoir connected with said outlet conduit and adapted to be continuously immersed in a second reservoir of liquid to be cooled; and an insulating partition member mounted on said outlet conduit for separating said first and second reservoir.

11. For use in a liquid cooler of the class described, a refrigerating unit embodying: a generator-absorber filled with a dry absorbent containing a fluid refrigerant; perforated ducts extending through said generator-absorber for delivering gaseous refrigerant into the body of absorbent contained therein; means for periodically heating said generator absorber to expel said refrigerant; a heat exchanger and condenser pipe connected with said generator-absorber and adapted to be continuously immersed in a first reservoir of liquid to be cooled; an outlet conduit connected with said last mentioned pipe; and a condensate reservoir connected with said outlet conduit and adapted to be continuously immersed in a second reservoir of liquid to be cooled.

12. For use in a liquid cooler of the class described, a refrigerating unit embodying: a generator-absorber filled with a dry absorbent containing a fluid refrigerant; perforated ducts extending through said generator-absorber for delivering gaseous refrigerant into the body of absorbent contained therein, said ducts being compressible under the expanding action of said absorbent; means for periodically heating said generator-absorber to expel said refrigerant; a heat exchanger and condenser pipe connected with said generator-absorber and adapted to be continuously immersed in a first reservoir of liquid to be cooled; an outlet conduit connected with said last mentioned pipe; and a condensate reservoir connected with said outlet conduit and adapted to be continuously immersed in a second reservoir of liquid to be cooled.

13. For use in a liquid cooler of the class described, a refrigerating unit embodying: a generator-absorber adapted to contain an absorbent and a fluid refrigerant; means for periodically heating said generator-absorber to expel said refrigerant from said absorbent; a preliminary cooling coil exposed to the atmosphere and connected with said generator-absorber; a heat exchanger and condenser pipe connected with said preliminary cooling coil and adapted to be continuously immersed in a body of liquid to be cooled; a condensate reservoir adapted to be immersed in another body of liquid to be cooled; and means connecting said condensate reservoir with said heat exchanger and condenser pipe.

14. For use in a liquid cooler of the class described a generator-absorber embodying: a shell; an axial tube in said shell forming a central heating chamber and an annular outer chamber adapted to contain a dry absorbent; a plurality of hollow perforated spacing members interposed between said tube and the outer wall of said shell, each of said spacing members including a longitudinal diaphragm and yieldable spacing means to permit the inward movement of said diaphragm during the expansion of said absorbent; a heating element in said heating chamber; means for periodically energizing said heating element; a heat exchanger and condenser pipe connected with said outer chamber; and a condensate reservoir connected with said last mentioned pipe.

15. For use in a liquid cooler of the class described, a refrigerating unit embodying: a generator-absorber comprising a shell, a tube in said shell forming a central heating chamber and an absorbent containing chamber, said last mentioned chamber being adapted to be filled with a dry absorbent containing a fluid refrigerant, a plurality of independent compressible hollow perforated spacing members interposed between said tube and the wall of said shell, a heating element in said heating chamber, and means for periodically energizing said heating element; a heat exchanger and condenser pipe connected with said absorbent containing chamber; and a condensate reservoir connected with said last mentioned pipe, said spacing members comprising channels with diaphragm plates movably mounted in the open side of said channels and compressible means in said channels behind said diaphragm plates.

16. For use in a liquid cooler of the class described a generator-absorber embodying: a shell; an axial tube in said shell forming a central heating chamber and an annular outer chamber adapted to contain a dry absorbent; a plurality of hollow perforated spacing members interposed between said tube and the outer wall of said shell and extending substantially throughout the length of said shell, each of said spacing members including a longitudinal diaphragm and yieldable spacing means to permit the inward movement of said diaphragm during the expansion of said absorbent; means for delivering a fluid refrigerant into said annular outer chamber; a heating unit in said heating chamber; and means for periodically operating said heating unit.

17. For use in a liquid cooler of the class described a generator-absorber embodying: a shell; an axial tube in said shell forming a central heating chamber and an annular outer chamber adapted to contain a dry absorbent; a plurality of hollow perforated spacing members interposed between said tube and the outer wall of said shell and extending substantially throughout the length of said shell, said spacing members being formed with longitudinal diaphragms adapted to be pressed inwardly under the expanding action of said absorbent; means for delivering a fluid refrigerant into said annular outer chamber; a heating unit in said heating chamber; and means for periodically operating said heating unit.

MAX ALEX.